No. 890,332. PATENTED JUNE 9, 1908.
E. BURHORN.
COOLING DEVICE.
APPLICATION FILED AUG. 6, 1906.
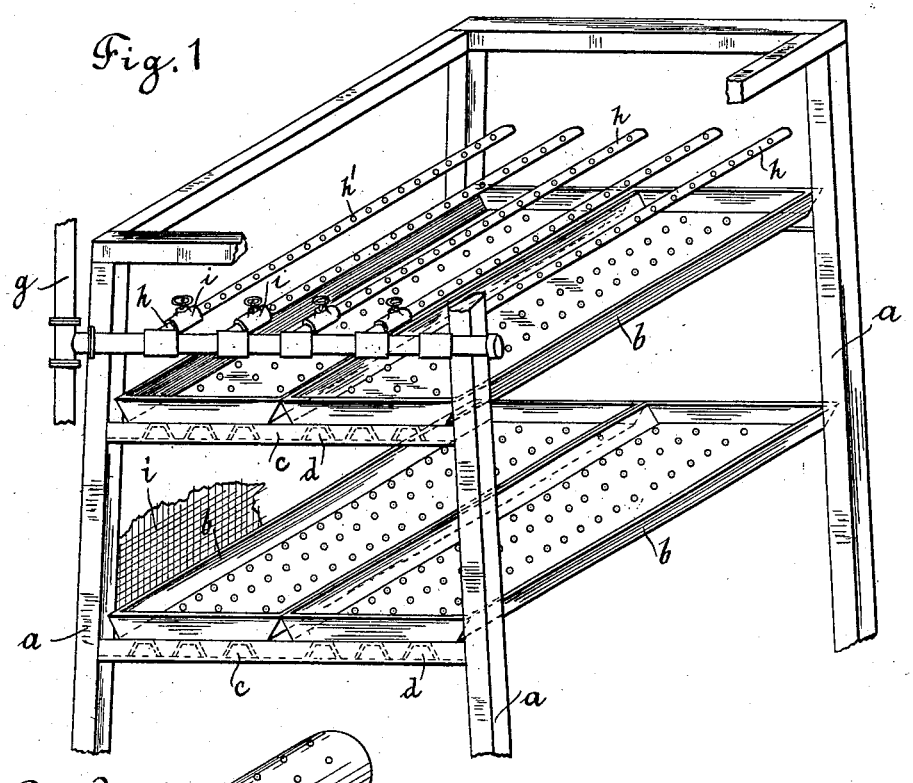
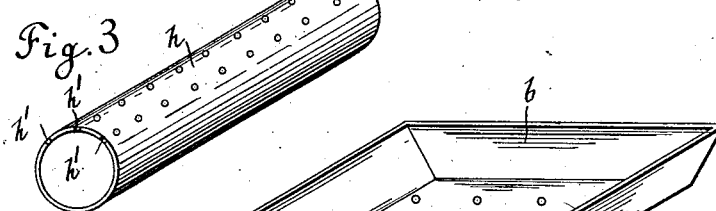
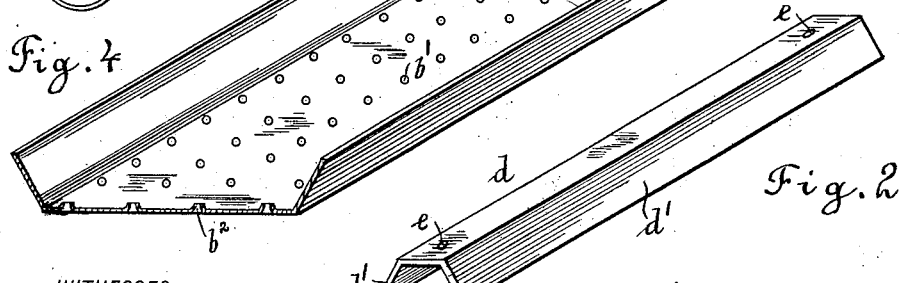
WITNESSES
Adolph Fischel.
INVENTOR
Edwin Burhorn
BY
Andrew Fouls Jr.
his ATTORNEY

UNITED STATES PATENT OFFICE.

EDWIN BURHORN, OF HOBOKEN, NEW JERSEY.

COOLING DEVICE.

No. 890,332.　　　　Specification of Letters Patent.　　　Patented June 9, 1908.

Application filed August 6, 1906. Serial No. 329,302.

*To all whom it may concern:*

Be it known that I, EDWIN BURHORN, a citizen of the United States, residing at Hoboken, in the county of Hudson and State of New Jersey, have invented certain new and useful Improvements in Cooling Devices, of which the following is a specification.

My invention relates to improvements in devices for cooling liquids and particularly to that class in which the liquid to be cooled is separated into small drops which are brought into contact with the air, and the object of my invention is to provide an effective means for cooling liquids by natural aeration and evaporation. I attain this object by the device illustrated in the accompanying drawings, in which Figure 1 is a perspective view of my device assembled, parts being broken away. Fig. 2 is a perspective view of the spraying leaf. Fig. 3 is a perspective view of one of the branch supply pipes. Fig. 4 is a cross section of one of the pans.

Similar letters refer to similar parts throughout the several views.

To a frame work comprising uprights $a$ $a$ $a$ I secure a series of pans $b$ $b$. These pans $b$ $b$ which I prefer to form of sheet metal, rest upon supports $c$ $c$, which supports are clamped to the uprights $a$ $a$ in any desired manner. To the bottom of the pans $b$ $b$ I secure a series of spraying leaves $d$ $d$ which I prefer to form of sheet metal and having a horizontal central section and bent over side sections or leaves $d'$ $d'$. The horizontal central section may be secured to the bottom of the pan $b$ by rivets passed through the holes $e$ $e$. In the bottom of the pan $b$ along the line of the spraying leaves $d$ $d$, I provide a series of perforations $b'$. These perforations $b'b'$ I prefer to form with a surrounding bead or raised surface $b^2$ which may be readily accomplished by forcing the stamping tool upward through the metal, thus leaving a slight bur around the perforation $b'$. The advantage of this arrangement is that the liquid is more evenly distributed over the bottom of the pan $b$. I provide a main supply pipe $g$ leading from the source of supply and to it I secure branch pipes $h$ $h$ provided with three parallel rows of perforations $h'$ $h'$ $h'$ in their upper surface, one of said rows of perforations being along the center line of the top of the pipe and the other rows of perforations being arranged on each side thereof, about midway between the extreme top and the extreme side of the pipe. I also provide valves $i$ $i$ upon each of the branch pipes $h$ $h$ by which the supply of water or other liquid may be regulated separately for each pipe.

My device being assembled as above described its operation will be as follows: The liquid to be cooled will be conveyed to the device through the supply pipe $g$ and will pass from it to the branch pipes $h$ $h$ from which it will be thrown in the form of spray through the perforations $h'$ $h'$ $h'$ falling into the upper pans $b$ $b$. The amount of liquid supplied to the pipes $h$ $h$ may be regulated by the valves $i$ $i$ so that the liquid will be evenly distributed. When the level of the liquid in the pipes $h$ $h$ reaches the lower rows of perforations it will when the pressure is so regulated as to keep the level of the liquid at this point, run out through said perforations and spread out on the surface of the pipe by capillary attraction and fall in spray to the pan below. The valves $i$ $i$ making it possible to keep the amount of water supplied to each of the pipes uniform. When desired, however, the valves may be opened, and the water or other liquid supplied in such quantity that it will be forced out through all of the perforations. The pans $b$ $b$ are preferably provided with inclined sides to permit them to fit more closely together, and also to allow the air to circulate more freely, as I find that when straight sides are used a portion of the pan close to the side is protected to some degree from the free circulation of the air. I also prefer to provide screens of wire or other suitable material on the sides of my device to prevent foreign substances from being blown into the liquid, and also to prevent to some extent the blowing away of the liquid.

My improved device being assembled as shown in Fig. 1, the liquid from the upper pan will drop through the perforations in the bottom of the pan onto the leaves arranged below the perforations and will be thrown by these leaves in spray to the pan below and this operation is continued through as many pans as may be desired to a reservoir or receiving tank of any desired form arranged below the device.

Having thus described my invention, what I claim is

A cooling device embodying a frame, a series of cooling pans carried thereby each provided with perforations in its bottom, and a series of spraying members, for each pan each consisting of a horizontal top section of rectangular contour having its upper face secured to the under face of said pan and having angular side sections, the securing means for said top section engaging said top section and the pan bottom.

In testimony whereof I affix my signature in presence of two witnesses.

EDWIN BURHORN.

Witnesses:
A. F. SCHMIDT,
E. P. MERRILL.